US011050195B2

(12) United States Patent
Friess et al.

(10) Patent No.: US 11,050,195 B2
(45) Date of Patent: Jun. 29, 2021

(54) CONTROL DEVICE WITH SHIELDING

(71) Applicant: Robert Bosch GmbH, Stuttgart (DE)

(72) Inventors: Gerald Friess, Grossbottwar (DE); Markus Kroeckel, Schwieberdingen (DE); Richard Gueckel, Landau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/632,624

(22) PCT Filed: Jul. 17, 2018

(86) PCT No.: PCT/EP2018/069346
§ 371 (c)(1),
(2) Date: Jan. 21, 2020

(87) PCT Pub. No.: WO2019/016183
PCT Pub. Date: Jan. 24, 2019

(65) Prior Publication Data
US 2020/0169045 A1 May 28, 2020

(30) Foreign Application Priority Data
Jul. 21, 2017 (DE) .................. 10 2017 212 601.9

(51) Int. Cl.
*H01R 4/66* (2006.01)
*H01R 13/6594* (2011.01)
(Continued)

(52) U.S. Cl.
CPC ....... *H01R 13/6594* (2013.01); *B60R 16/023* (2013.01); *B60R 16/0215* (2013.01); *H01R 13/6471* (2013.01); *H01R 2201/26* (2013.01)

(58) Field of Classification Search
CPC ............ H01R 13/6594; H01R 13/6471; H01R 2201/26; B60R 16/0215; B60R 16/023
(Continued)

(56) References Cited

U.S. PATENT DOCUMENTS 6,350,134 B1   2/2002 Fogg et al.
7,445,471 B1  11/2008 Scherer et al.
(Continued)

FOREIGN PATENT DOCUMENTS

CN   205212085 U   5/2016
CN   106030924 A  10/2016
(Continued)

OTHER PUBLICATIONS

International Search Report for Application No. PCT/EP2018/069346 dated Oct. 10, 2018 (English Translation, 2 pages).

*Primary Examiner* — Khiem M Nguyen
(74) *Attorney, Agent, or Firm* — Michael Best & Friedrich LLP (57) ABSTRACT

The invention relates to a control device (10), having a circuit carrier (14), having a plurality of series arranged in the region of a circuit carrier (14) or of a connection body (17) connected to the circuit carrier and of a plug connection body (12), said series each having a plurality of first and second electrical contact elements (26, 27, 36, 38; 38*a;* 72, 76), which are arranged next to one another in the series and which serve to make contact with the circuit carrier (14) or the connection body (17) and from mating contacts (28, 29) of a plug (100), wherein the first contact elements (26, 27) serve for signal transmission and the second contact elements (36, 38; 38*a;* 72, 76) serve to form an electromagnetic shielding (40; 70) for at least one first contact element (26, 27).

19 Claims, 8 Drawing Sheets

(51) Int. Cl.
  *B60R 16/02*      (2006.01)
  *B60R 16/023*     (2006.01)
  *H01R 13/6471*    (2011.01)

(58) Field of Classification Search
  USPC .................................................. 439/92–108
  See application file for complete search history.

(56) References Cited

U.S. PATENT DOCUMENTS

| | | |
|---|---|---|
| 8,496,486 B2 | 7/2013 | Szczensy et al. |
| 9,004,942 B2 * | 4/2015 | Paniagua ........... H01R 13/6598 439/607.07 |
| 9,450,344 B2 * | 9/2016 | Cartier, Jr. ........... H01R 12/737 |
| 10,840,649 B2 * | 11/2020 | Gailus ................ H01R 13/6473 |
| 2005/0245133 A1 | 11/2005 | Scherer et al. |
| 2012/0184145 A1 | 7/2012 | Zeng |
| 2013/0231008 A1 | 9/2013 | Gao et al. |
| 2016/0211629 A1 | 7/2016 | Phillips et al. |
| 2016/0344141 A1 | 11/2016 | Cartier et al. |

FOREIGN PATENT DOCUMENTS

| | | |
|---|---|---|
| CN | 106919093 A | 7/2017 |
| DE | 112013005786 | 8/2015 |

* cited by examiner

CONTROL DEVICE WITH SHIELDING

BACKGROUND OF THE INVENTION

The invention relates to a control device and to an electrical connection arrangement using a control device according to the invention.

Control devices, for example for motor vehicle applications, are known in various designs. Such a control device usually comprises at least one circuit carrier, for example in the form of a printed circuit board, which is arranged in a housing of the control device, has an electronic circuit and can be connected to a plug of a cable harness of the motor vehicle via a plug connection body connected to the circuit carrier. In this case, the plug connection body forms, together with the plug of the cable harness, an electrical connection arrangement. A plurality of rows of contact elements, which are arranged parallel to one another, are also typically arranged in the plug connection body, which contact elements are partially encapsulated by the plug connection body in the form of a plastic injection-molded part, wherein the contact elements in each row are in turn at a distance from one another. Such an arrangement of contact elements in the plug connection body is also referred to as a male multipoint connector and is standardized in so far as the dimensions and/or cross sections of the contact elements and the distances between the individual rows of contact elements are firmly defined in order to be able to form standardized interfaces between the control device and the corresponding plug. The contact elements are usually in the form of leadframe elements having a section which is arranged parallel to the circuit carrier and can be connected to mating contacts of the plug and a further section which is usually arranged perpendicular to said section, is in the form of a press-in pin, for example, and can be pressed into the circuit carrier or into a corresponding connection region for the circuit carrier. Such contact elements are usually used to transmit analog (voltage) signals or else are used as ground pins.

Future uses of such control devices increasingly require the possibility of being able to transmit signals at high data transmission rates. In this case, data transmission rates of up to 1 Mbit per second are typically meant. Ethernet lines which enable a sufficiently high data transmission rate in this respect are used for this purpose, for example. The important factor in this case is that such lines or Ethernet lines are arranged in a manner protected or shielded from the influence of electromagnetic radiation. The problem exists in this case of arranging or forming Ethernet lines, for example, in the region of the control device or the plug connection body in such a manner that the desired shielding effect is achieved, on the one hand, and the highest possible flexibility with respect to the control device and control device variants and the use of standardized components and geometries are enabled, on the other hand.

SUMMARY OF THE INVENTION

The control device according to the invention has the advantage that it makes it possible to shield (first) contact elements used to transmit signals in a relatively simple manner in terms of design using components which are known per se and have a relatively simple design. For this purpose, the invention substantially provides for second contact elements to be provided in addition to the first contact elements which are used to transmit signals, which second contact elements surround the first contact elements inside the plug connection body or are arranged in a manner overlapping said first contact elements, wherein the second contact elements are also connected to electrical ground potential of the control device. As a result of the first contact elements being overlapped or covered by the second contact elements which form a shield, the first contact elements can be shielded from electromagnetic radiation. Such overlapping or shielding of the first contact elements by means of the second contact elements takes place, in particular, by virtue of the second contact elements being arranged in a parallel manner and at a short distance from the direction of extent of the first contact elements and in this case having an extent or size which corresponds at least to those areas of the first contact elements which face the second contact elements. In other words, shielding is therefore enabled using second contact elements, wherein the second contact elements are designed in the manner of the first contact elements, and wherein the second contact elements are connected to electrical ground potential. In addition to using at least approximately identical or similar first and second contact elements, such an inventive design of the control also makes it possible to form interfaces to the control device or the circuit carrier, which makes it possible to use standardized interfaces.

In order to optimize the shielding effect for the first contact elements used to transmit signals or to achieve clearances between second contact elements, which clearances are as small as possible and promote coupling-in of electromagnetic radiation, provision is made for the second contact elements which are used to form the shield of the at least one first contact element to be arranged directly beside the at least one first contact element. In this case, a direct arrangement is understood as meaning the fact that no further contact elements are arranged between the second contact elements which are assigned to the at least one first contact element and form the shield, wherein the distance between the first and second contact elements usually corresponds to the discussed standardized distances in the region of the plug connection body or the circuit carrier.

As already explained above, it is particularly advantageous if the first and second contact elements are arranged at standardized distances from one another at least in the region of the plug connection body, preferably also in the region in which they are connected to the circuit carrier. Such a design of the control device makes it possible, in particular, to adapt the control device to a wide variety of requirements, in particular a different arrangement and number of first contact elements to be shielded, in a particularly simple manner by virtue of adaptations being effected only by differently designed plug connection bodies, wherein the latter form interfaces which are standardized at least on the plug side on account of the standardized dimensions.

In order to optimize the shielding effect, provision is also made for the at least one first contact element which is used to transmit signals to be shielded in different planes or directions. In other words, this means that shielding elements are present not only above or below the first contact element but also to the side of the first contact element with respect to the cross section of the first contact element.

One particularly simple configuration of lateral shielding elements provides for second contact elements which are arranged in the same row as the at least one first contact element on both sides of the at least one first contact element to be identical to the at least one first contact element. It is meant here that these second contact elements are identical to the at least one first contact element, possibly with the exception of the end regions which are remote from the circuit carrier.

A further optimization of the shielding effect with respect to the second contact elements which are in a different row than the at least one first contact element to be shielded provides for the second contact elements which are arranged in a different row than the at least one first contact element to each form a shielding plate, the width of which, in the region overlapping the first contact element, is greater than the width of the at least one first contact element, at least in certain regions.

For handling reasons in particular, possibly also for reasons of the simplest possible production of such a shielding plate, the latter has, for example, at least one slot or an opening. In this case, provision may be made, in particular, for the at least one slot or the opening to be arranged in a manner aligned with a press-in shoulder of the first contact element for pressing the first contact element into an opening of the circuit carrier or of another element. Such a configuration of the shielding plate makes it possible to press the first contact element into a corresponding opening by means of a corresponding press-in tool which engages through the region of the at least one opening or of the slot.

Instead of a shielding plate, provision may be made for the second contact elements which are arranged in a different row than the at least one first contact element to be designed like the at least one first contact element. In this case, this similarity of the design relates, in particular, to the fundamental type and configuration of the second contact elements in the form of leadframe elements which are in the form of press-in pins, while those end regions of the second contact elements which are remote from the circuit carrier project beyond the corresponding end regions of the first contact elements, for example, so that the end regions of the second contact elements can be brought into bearing contact with shielding elements on the plug side.

In one specific configuration of first contact elements to be shielded, provision is made for two first contact elements arranged directly beside one another to be part of a shielded data line, in particular an Ethernet line, and for some of the second contact elements which are used to shield the two first contact elements to be designed to make contact with a shielding housing of the data line on the plug side.

In particular, in order to form such contact with a shielding housing of the data line on the plug side, provision is made for the second contact elements to have a different length on the side which is remote from the circuit carrier such that the second contact elements arranged in the same row as the at least one first contact element project beyond second contact elements assigned to the other rows.

A further improved or optimized shielding effect with respect to the regions to the side of the at least one first contact element is enabled if a second contact element forms a closed shielding area in a plane arranged to the side of the at least one first contact element. It is meant here that the shielding area does not only completely overlap the first contact element, but also projects beyond the lateral region of the first contact element.

A further optimization of the shielding effect provides for the separating element which is usually present between two rows of contact elements in the region of the plug connection body and in practice is also referred to as a "contact protection rib" to be simultaneously used to shield at least one first contact element. For this purpose, it is specifically proposed that the plug connection body has, on the side which is remote from the circuit carrier, a separating element (contact protection rib) which is arranged between two rows of first and/or second contact elements and an end surface of which projects beyond an end of the at least one first contact element, that the separating element consists of metal, at least in certain regions, and that the metal is connected to electrical ground potential. Such a design makes it possible, in particular, to provide the shielding element of a data line on the plug side with an opening or the like, for example, on the side facing the separating element without thereby making it possible to couple in electromagnetic radiation. A greater design possibility is therefore created for the shielding element on the plug side for the (data) line.

The invention also comprises an electrical connection arrangement between a control device according to the invention described this far and a plug having at least one mating contact for making contact with a first contact element in the control device, wherein the mating contact is surrounded by a shielding housing at least in certain regions, and wherein the shielding housing is arranged in bearing contact with at least one second contact element of the control device.

Since a preferred field of application of the control device described this far is motor vehicle applications, provision is also made for the plug to be part of a cable harness plug of a motor vehicle.

BRIEF DESCRIPTION OF THE DRAWINGS

Further advantages, features and details of the invention emerge from the following description of preferred exemplary embodiments and on the basis of the drawing, in which.

Identical elements or elements having an identical function are provided with the same reference signs in the figures.

DETAILED DESCRIPTION

Figure 1:
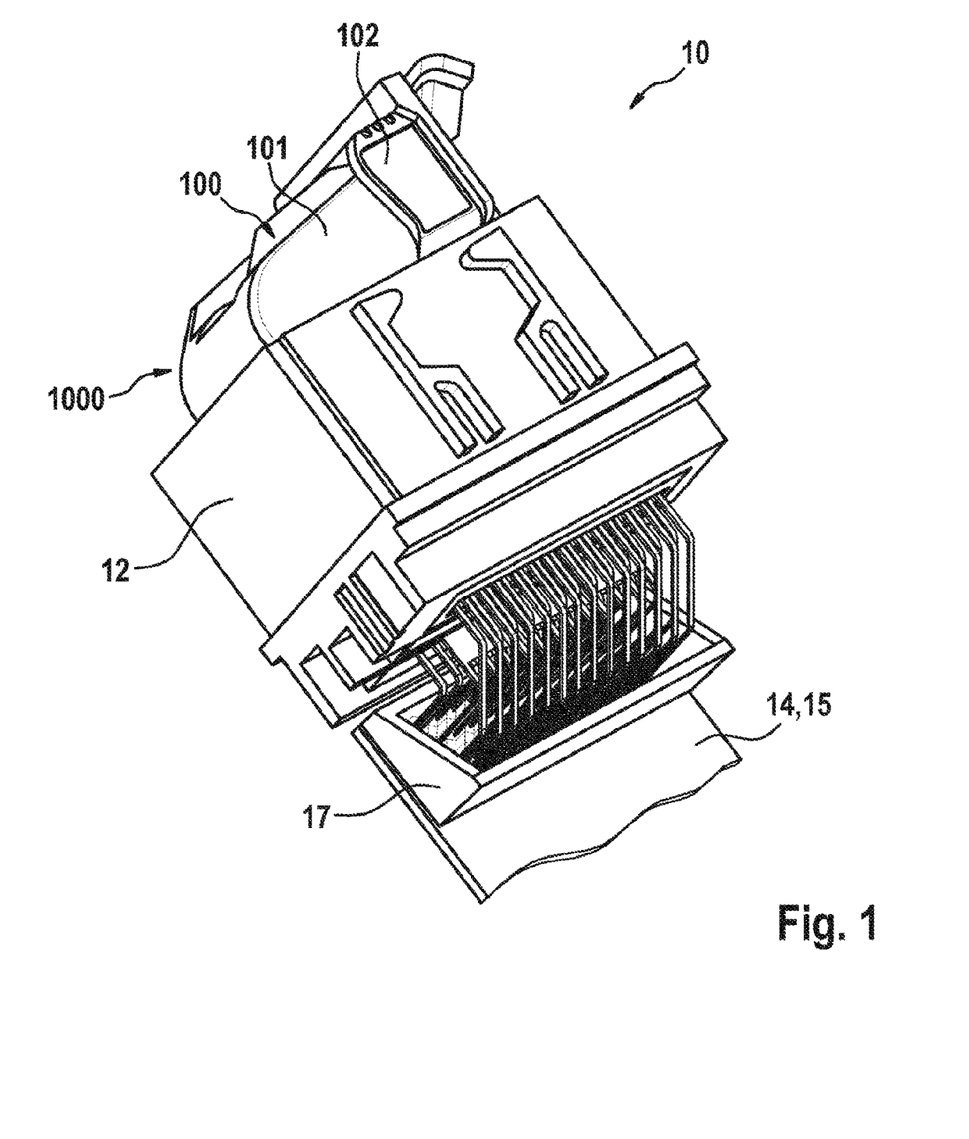
FIG. 1 shows a perspective illustration of a section of a control device having a plug of a cable harness which is connected to the control device.

FIG. 1 illustrates a section of a control device 10, as is used, in particular, but not restrictively, as a control device 10 in a motor vehicle. The control device 10 forms, together with a plug 100 which can be seen in FIG. 1, a connection arrangement 1000, wherein the plug 100 is likewise preferably and not restrictively part of a cable harness of the motor vehicle.

The plug 100 has a socket housing 101 with a plug lever 102 which is pivotably arranged on the socket housing 101 and is used to mechanically lock the plug 100 to a plug connection body 12 of the control device 10. Two socket inserts 104, 106 which can be seen in FIG. 2 can be inserted into the socket housing 101, wherein the socket inserts 104, 106 are designed to receive either analog lines 1 or else Ethernet lines 2, for example. For this purpose, corresponding receptacles for integrating or fastening elements of the lines 1, 2 are provided in the socket inserts 104, 106. In particular, it can be seen from FIG. 2 that the (upper) socket insert 104 has two rows 3, 4 which are arranged parallel to one another and each have analog lines 1 which are laterally arranged at equal distances from one another. In contrast, only three Ethernet lines 2 which are each arranged at a lateral distance from one another in a (single) row 5 are provided in the (lower) socket insert 106, as can be seen from FIG. 3, in particular.

Figure 12:
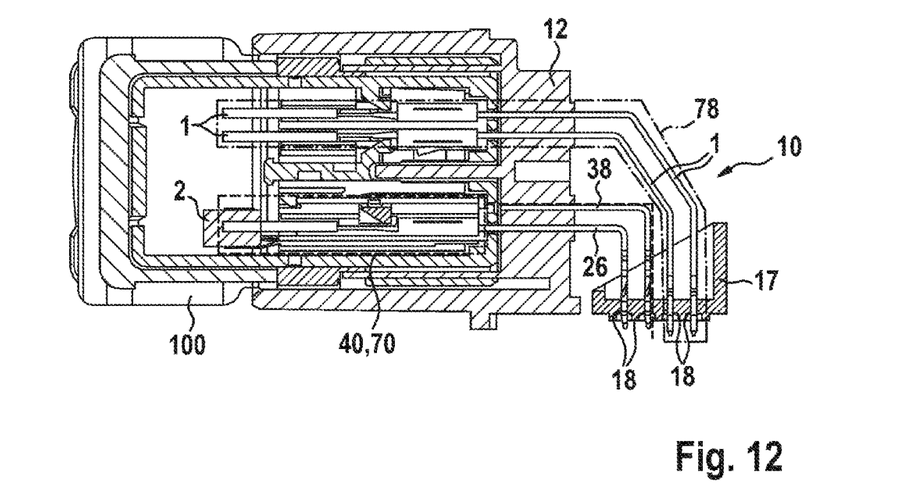
FIG. 12 shows a schematic illustration of the connection region between the control device and the plug for explaining different shielding regions.

The plug connection body 12 is surrounded, in certain regions, by a housing of the control device 10, which housing is not illustrated, is known per se and has, in its interior, a circuit carrier 14, for example in the form of a printed circuit board 15. The circuit carrier 14 and the printed circuit board 15 carry an electronic circuit (likewise not illustrated) which is connected to the cable harness of the motor vehicle via the plug connection body 12 and the plug 100. The connection between the circuit carrier 14 and the plug connection body 12, which is in the form of an injection-molded part, is effected in the region of the circuit carrier 14 itself or in the region of a connection body 17 which is connected to the circuit carrier 14. Receiving openings 18 which are illustrated only in FIGS. 12 and 13 and are connected to the circuit carrier 14 or to the electronic circuit of the circuit carrier 14 via metallizations, for example, are formed in the connection body 17.

Figure 2:
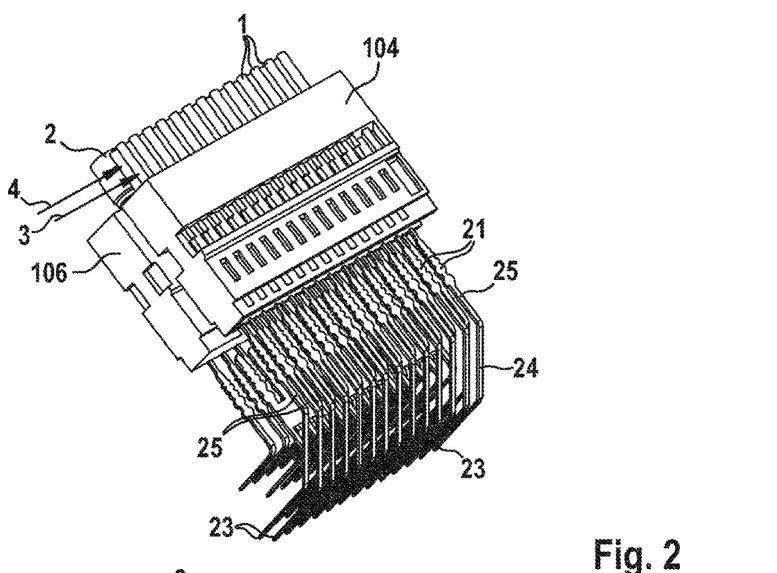
FIG. 2 shows a perspective illustration of components which are used to form electrical lines or connections in the region of the control device according to FIG. 1.

The electrical connection between the receiving openings 18 and the analog lines 1 is effected in the region of the control device 10 or the plug connection body 12 by means of first contact elements 21 which are illustrated in FIG. 2 and are configured or designed as leadframe components in a manner known per se. In particular, the first contact elements 21 have, for the analog lines 1, a first section 23 which is aligned with an associated receiving opening 18 in the connection body 17 and is in the form of a press-in pin. The first section 23 is connected, by way of example via an intermediate section 24 arranged obliquely with respect to the first section 23, to a second section 25 which runs perpendicular to the first section 23 and whose end region, arranged in the plug connection body 12, interacts with a socket-like mating element of the analog line 1 when forming the connection arrangement 1000.

Figure 4:
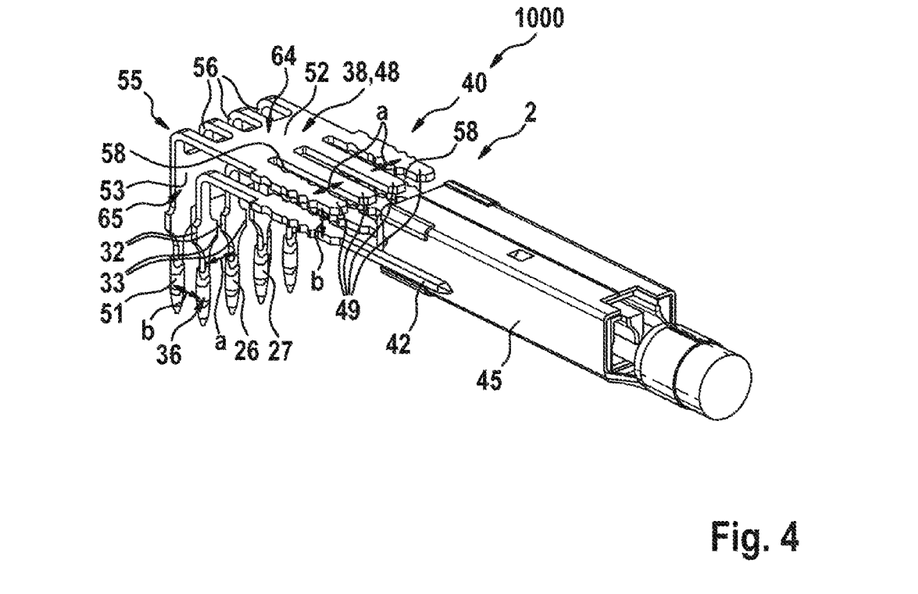
FIG. 4 shows a perspective illustration of elements for forming a shield on the control device side and on the cable harness side.
Figure 5:
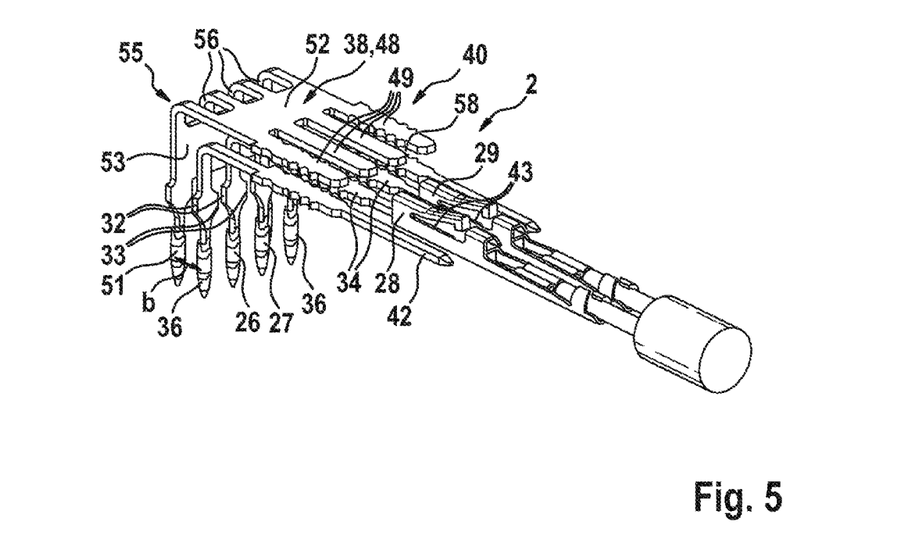
FIG. 5 shows a perspective illustration of the components according to FIG. 4 without a shielding housing of an Ethernet line which is illustrated in FIG. 4.

In contrast, the Ethernet line 2 has, on the control device side, two first contact elements 26, 27 which are used to transmit signals and, in a manner corresponding to the illustration in FIGS. 4 and 5, are arranged beside one another in a common plane or row 6. When forming the connection arrangement 1000, the two first contact elements 26, 27 interact with socket-like mating contacts 28, 29 of the Ethernet line 2 which are arranged in the region of the plug 100.

The two first contact elements 26, 27 likewise have a first section 31 which is oriented in a manner aligned with the respectively assigned receiving opening 18 in the connection body 17 or the circuit carrier 14, wherein the first section 31 has two press-in shoulders 32, 33 which are used to insert or press the first section 31 into the receiving opening 18 by means of a press-in tool (not shown) when connecting the first section 31 to the receiving opening 18 in order to form a press-fit connection. The first section 31 can be connected to the respective mating element 28, 29 in the plug 100 via a second section 34 which is preferably arranged at right angles to the first section 31. The first contact elements 26, 27 of the Ethernet line 2 are also in the form of leadframe components. Furthermore, on the control device side, the Ethernet line 2 has two differently configured second contact elements 36, 38 for forming an electromagnetic shield 40 for the two first contact elements 26, 27 of the Ethernet line 2.

When producing the plug connection body 12, both the first contact elements 21, 26 and 27 and the second contact elements 36, 38 are placed into the injection mold for the plug connection body 12 and are encapsulated by the plastic of the plug connection body 12 in certain regions.

As can be seen, by way of example, from FIGS. 4 and 5, a second contact element 36 is respectively provided in the row in which the two first contact elements 26, 27 are also arranged in the plug connection body 12 on the side facing the respective first contact element 26, 27, the geometrical design of said second contact element corresponding substantially to the first contact elements 26, 27, that is to say the second contact elements 36 can likewise be pressed into receiving openings 18 of the connection body 17 or of the circuit carrier 14, with the result that the corresponding sections of the second contact elements 36 are designed as press-in pins. On the side which is remote from the circuit carrier 14, the second contact elements 36 have end sections 42 which can be designed in a lengthened form in comparison with the end sections 43 of the first contact elements 26, 27, that is to say project beyond the end sections 43 of the first contact elements 26, 27 on the end face.

According to the illustration in FIG. 4, the end sections 42 of the second contact elements 36 are used to come into bearing contact with a metal shielding housing 45 surrounding the socket-like mating elements 28, 29 when forming the connection arrangement 1000. The important factor in this case is that the second contact elements 36, 38 are connected to electrical ground potential on the control device side, that is to say in the region of the circuit carrier 14 or the receiving opening 18.

Figure 3:
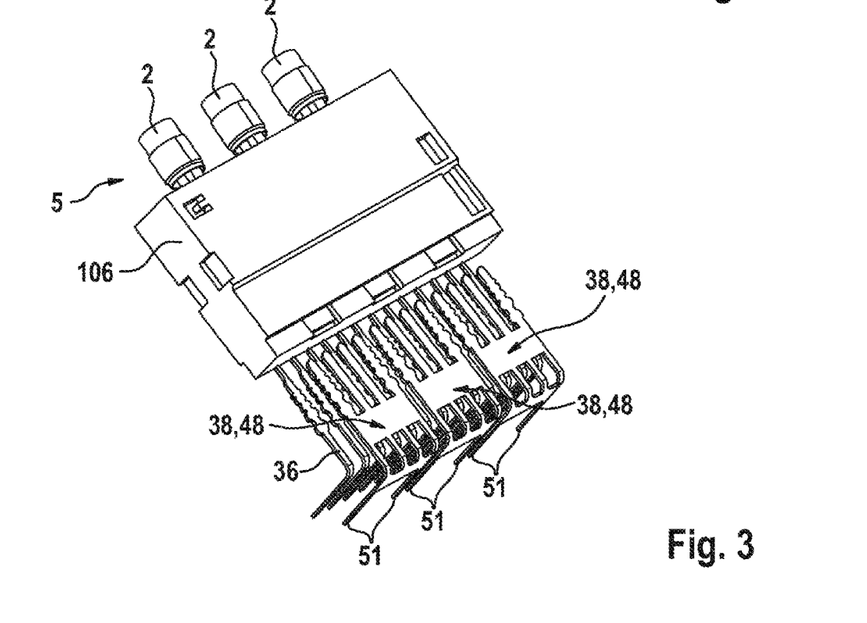
FIG. 3 shows a perspective illustration of some of the components according to FIG. 2 for explaining shielding measures for a data line.

The second contact elements 36 are arranged in the same row or on the same plane as the first contact elements 26, 27 on both sides of the two first contact elements 26, 27. In contrast, the second contact element 38 is in the form of a bent shielding plate 48 and is arranged parallel to the first and second contact elements 26, 27 and 36. On the side facing the shielding housing 45, the shielding plate 48 has, by way of example, four pin-like end sections 49 which are arranged or end at a short distance from the corresponding end face of the shielding housing 45 when forming the connection arrangement 1000. In this case, the distance or the cross section of the end sections 49 corresponds to the distance or the cross section of the first and second contact elements 26, 27, 36, with the result that a contact spacing a of 1.8 mm, for example, is respectively formed both between the end sections 49 and between the first contact elements 26, 27 and between the first contact elements 26, 27 and the adjacent second contact elements 36, which contact spacing corresponds to a standardized dimension. Furthermore, on the side facing the circuit carrier 14 or the connection body 17, the shielding plate 48 has two end sections which are in the form of press-in pins 51 and can be pressed into corresponding receiving openings 18 connected to electrical ground potential (FIGS. 1 to 3).

As can be seen from FIGS. 4 and 5, the press-in pins 51 also have the same geometry or shape as the corresponding regions of the first contact elements 26, 27 and of the second contact elements 36, with the result that a horizontal distance b between the press-in pins 51 and the second contact elements 36, which runs perpendicular to the contact spacing a, also corresponds to a standardized contact spacing on the circuit carrier 14 or the connection body 17.

The shielding plate 48 also has two area sections 52, 53 which extend over the entire region of the first and second contact elements 26, 27 and 36 or overlap the latter. The two middle end sections 49 of the shielding plate 48 also overlap the corresponding sections of the first contact elements 26, 27. Three passage openings 56 which are arranged parallel to one another are formed in the bending region 55 of the shielding plate 48 or of the second contact element 38, which passage openings possibly make it possible to achieve an operative connection to the press-in shoulders 32, 33 of the first contact elements 26, 27 arranged below the shielding plate 48 or of the second contact elements 36 by means of the press-in tool (not illustrated). However, depending on the application, provision may also be made for the passage openings 57, as well as the slots 58 between the end sections 49, to be closed or for the shielding plate 48 to form a completely closed metal area.

Figure 6:
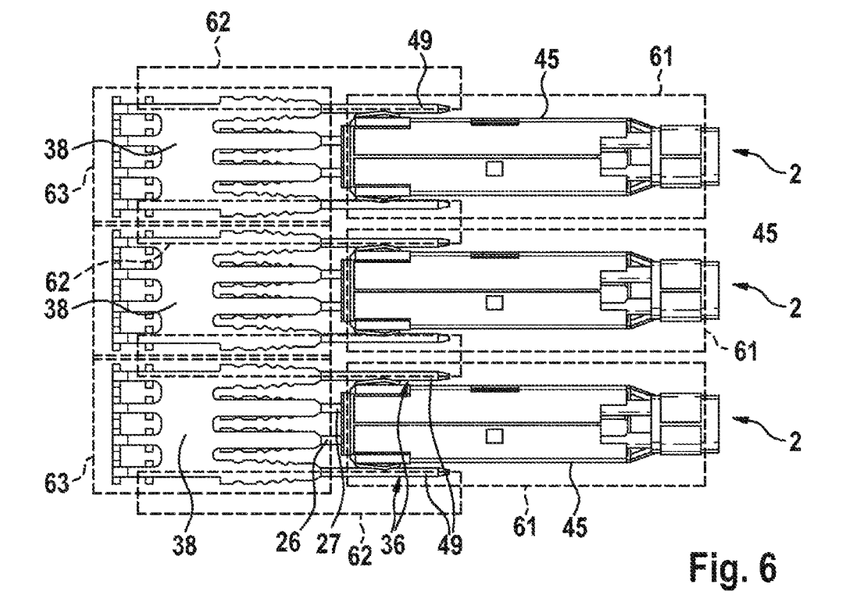
FIG. 6 shows a plan view of a section of a connection arrangement between the control device and Ethernet lines.

FIG. 6 uses, by way of example, three Ethernet lines 2 which are arranged directly beside one another to illustrate the fact that the shield has a total of three shielding sections 61 to 63 in the region in which the Ethernet line 2 is connected to the two second contact elements 36, 38. The first shielding section 61 is formed on the plug side by the shielding housing 45. The second shielding section 62 is formed by the second contact elements 36 and, in particular, the two end sections 49 of the shielding plate 48 which are each arranged on the edge. The third shielding section 63 is formed by the two sections 64, 65 of the shielding plate 48 or of the second contact element 38 (FIG. 4) which are arranged perpendicular to one another. The illustration in FIG. 6 also illustrates that the Ethernet lines 2 can be positioned in the form of a modular system with a flexible arrangement in the region of the plug connection body 12 as a result of the standardized arrangement or the standardized geometry of the first and second contact elements 26, 27 and 36, 38.

Figure 7:
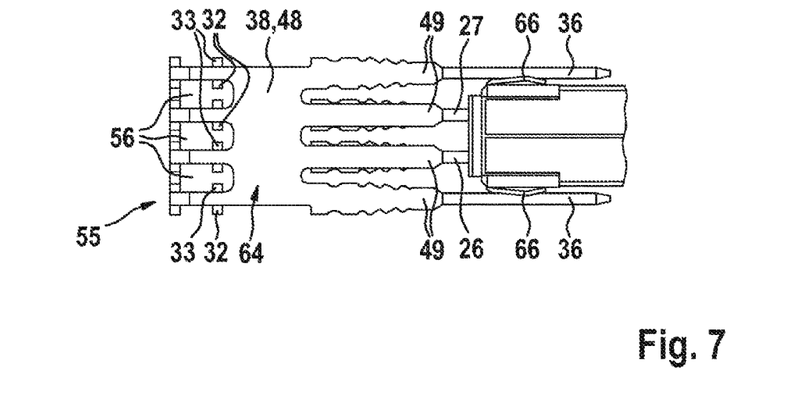
FIG. 7 shows a plan view of the region in which an individual Ethernet line is connected to shielding elements on the control device side.

It can be seen in a plan view in FIG. 7 that the four end sections 49 of the section 64 of the second contact element 38 or shielding plate 48 at least substantially completely overlap the corresponding regions of the two first contact elements 26, 27 and of the second contact elements 36 in the plane of the drawing in FIG. 7. It can also be seen from FIG. 7 that the passage openings 56 in the bending region 55 of the shielding plate 48 enable access to the press-in shoulders 32, 33 of the first contact elements 26, 27 and of the second contact elements 36. It can finally be seen from FIG. 7 that the shielding housing 45 has, for example, spring regions 66 which project away from the wall of the shielding housing 45 and are arranged in bearing contact with the end sections 42 of the second contact elements 36.

Figure 8:
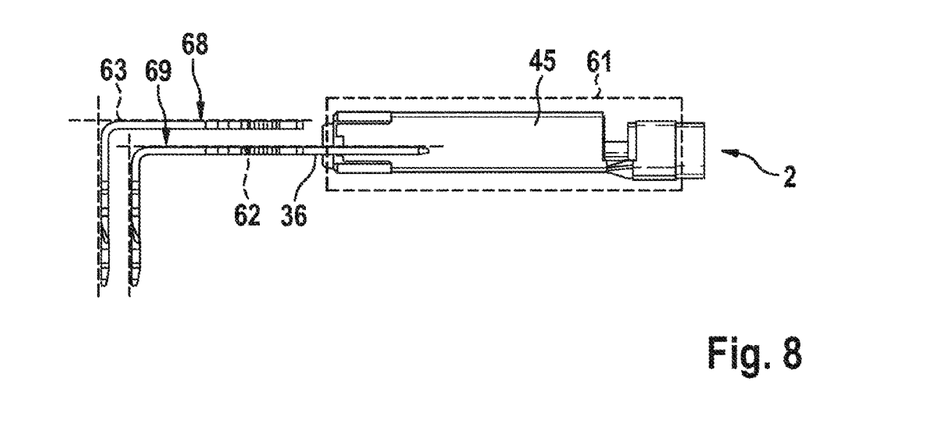
FIG. 8 and FIG. 9 show a side view and a plan view, respectively, of the connection region according to FIG. 7 for illustrating different shielding regions.
Figure 9:
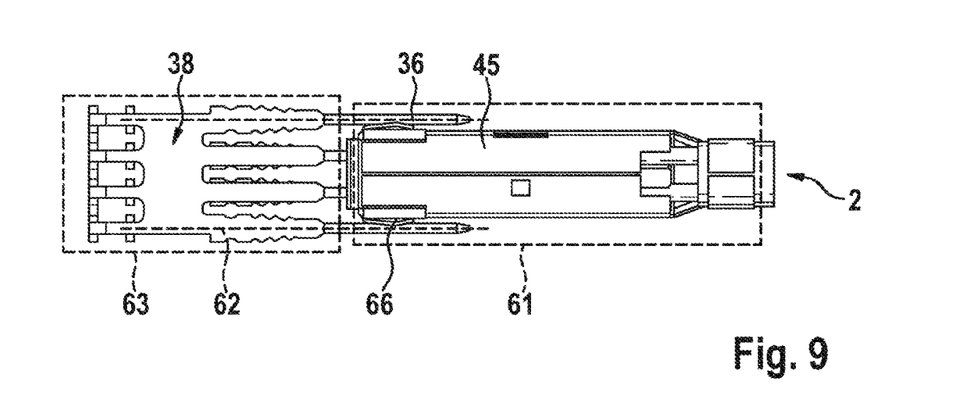

The shielding sections 61 to 63 according to FIG. 6 can be seen again in FIGS. 8 and 9. It can be seen from FIG. 8, in particular, that the two second contact elements 36, 38 form two shielding planes 68, 69 which are arranged parallel to one another and do not only run parallel to the circuit carrier 14 (not illustrated in FIG. 8) or to the connection body 17, but also in those sections of the contact elements 36, 38 which are arranged perpendicular to the circuit carrier 14.

Figure 10:
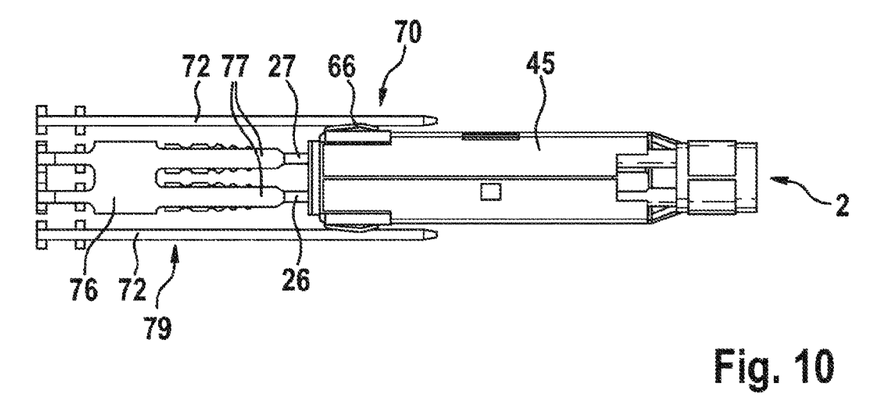
FIG. 10 shows an illustration of a modified connection between shielding elements on the control device side and an Ethernet line using specially designed lateral shielding plates.
Figure 11:
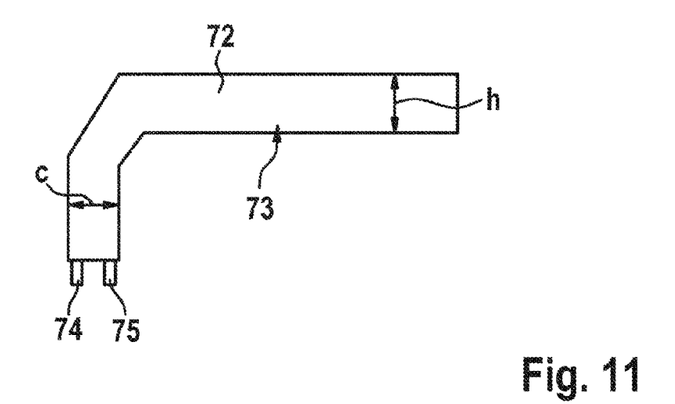
FIG. 11 shows a side view of a shielding plate used in FIG. 10.

FIGS. 10 and 11 illustrate a shield 70 having two second contact elements 72 which each rest against the side of the shielding housing 45. The two second contact elements 72 are in the form of side plates 73 which allow two press-in pins 74, 75 for connection to corresponding receiving openings 18 of the circuit carrier 14 or of the connection body 17 on the side facing the circuit carrier 14 (not illustrated). The height h and width c of the side plates 73 are such that said side plates overlap a further second contact element 76 in the form of a shielding plate and overlap the two first contact elements 26 and 27 in the side view. In contrast to the embodiment variant described first, this makes it possible to dispense with the second contact elements 36. The second contact element 76 has a reduced width in comparison with the second contact element 38 and therefore has only two end sections 77 which overlap the corresponding regions of the first contact elements 26, 27. The important factor is also that the length of the side plates 73 is such that the entire shielding housing 45 need not be covered, but rather it suffices if contact is made with the spring regions 66.

FIG. 12 again illustrates, in section, the connection region between the plug 100 and the control device 10 in the region of the plug connection body 12. In this case, it can be seen, in particular, that the shield 40 or 70 separates the region of the high-speed or Ethernet lines 2 from a normal region 78 which is used for analog data transmission and in the region of which the analog lines 1 are arranged.

Figure 13:
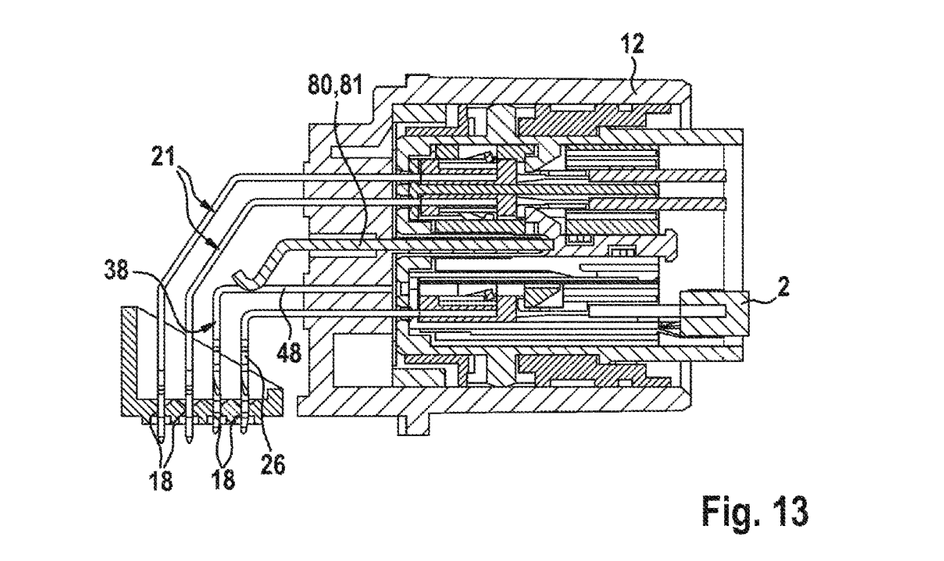
FIG. 13 shows a further illustration of a connection region between a control device and a plug using a contact protection rib which forms a shielding element in longitudinal section.

It can be seen in FIG. 13 that a contact protection rib 81 which is arranged in the plug connection body 12, is used as a separating element 80 and projects beyond at least the first contact elements 26, 27 on the side remote from the circuit carrier 14 consists of metal and is arranged in bearing contact with the shielding plate 48, for example. As a result of the metal design of the separating element 80, the latter also acts as a shielding element for the regions of the Ethernet line 2 which are arranged below the separating element 80. Since the separating element 80 consisting of metal covers the shielding housing 45 of the Ethernet line 2, it is possible to form the shielding housing 45 with openings, in certain regions, on the side facing the separating element 80.

It is additionally mentioned that it is also possible, instead of a separating element 80 consisting completely of metal, to provide the latter with a metal coating or the like, for example on the side facing the Ethernet line 2. Furthermore, it is also not necessary to connect the separating element 80 to the shielding plate 48; rather, the separating element 80 can instead also be connected to the second contact elements 36 or else other ground pins.

Figure 14:
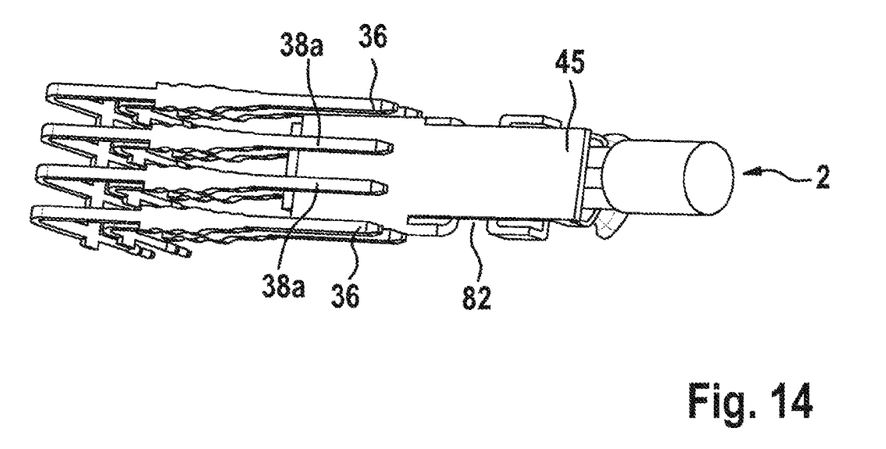
FIG. 14 shows a perspective illustration of a further modified configuration between shielding elements on the control device side and a shielding housing of an Ethernet line.

It can finally be seen from FIG. 14 that the shielding housing 45 need not be in the form of a shielding housing 45 whose cross section is completely closed, in particular when using the separating element 80 used for shielding, but rather may have at least one opening 82. The important factor is only that those regions of the second contact elements 36 which are used for ground contact can be arranged in bearing contact with the shielding housing 45. In this case, it is mentioned that the axial length of the second contact elements 36, as can also be seen from FIGS. 6, 9 and 10, need not extend over the entire length of the shielding housing 45. Rather, it suffices to establish ground contact, that is to say that contact is made with the spring regions 66, for example. It is also seen from FIG. 14 that the second contact elements 38a are substantially identical to the second contact elements 36 or to the first contact elements 26, 27 which cannot be seen in FIG. 14, that is to say are in the form of pins. They likewise touch the shielding housing 45, but do not form a monolithic shielding plate 48.

The control device 10 described this far can be altered or modified in various ways without deviating from the concept of the invention.

The invention claimed is:

1. A control device (10), having a circuit carrier (14), having a plurality of rows (3 to 5) which are arranged in a region of a circuit carrier (14) or a connection body (17) and a plug connection body (12) and each have a plurality of first and second electrical contact elements (21, 26, 27, 36, 38; 38a; 72, 76) which are arranged beside one another in the row (3 to 5) and are configured to make contact with the circuit carrier (14) or the connection body (17) and mating contacts (28, 29) of a plug (100), wherein the first contact elements (21, 26, 27) are configured to transmit signals and the second contact elements (36, 38; 38a; 72, 76) are configured to form an electromagnetic shield (40; 70) for at least one first contact element (26, 27), wherein the first sections (23, 31) are connected to the circuit carrier (14) or to the connection body (17) and the second sections (25, 34) are configured to be connected to the mating contacts (28, 29) of the plug (100), wherein the second contact elements (36, 38; 38a; 72, 76) which are connected to electrical ground potential of the control device (10) and are configured to form the shield (40; 70) are arranged in a manner overlapping at least one section (31, 34) of the first contact element (26, 27), wherein two first contact elements (26, 27) arranged directly beside one another are part of a shielded data line, and wherein some of the second contact elements (36) which are used to shield (40) the two first contact elements (26, 27) are configured to make contact with a shielding housing (45) on a plug side.

2. The control device as claimed in claim 1, characterized in that the second contact elements (36, 38; 38a; 72, 76) which are used to form the shield (40; 70) of the at least one first contact element (26, 27) are arranged directly beside the at least one first contact element (26, 27).

3. The control device as claimed in claim 1, characterized in that the first and second contact elements (21, 26, 27, 36, 38; 38a; 72, 76) are arranged at standardized distances (a, b) from one another at least in a region of the plug connection body (12).

4. The control device as claimed in claim 1, characterized in that the second contact elements (36) which are arranged in the same row as the at least one first contact element (26, 27) on both sides of the at least one first contact element (26, 27) are identical to the at least one first contact element (26, 27).

5. The control device as claimed in claim 1, characterized in that the second contact elements (38; 76) which are arranged in a different row than the at least one first contact element (26, 27) each form a shielding plate (48), a width of which, in a region overlapping the at least one first contact element (26, 27), is greater than a width of the at least one first contact element (26, 27), at least in certain regions.

6. The control device as claimed in claim 5, characterized in that the shielding plate (48) has at least one slot (58) or an opening (56).

7. The control device as claimed in claim 6, characterized in that the at least one slot (58) or the opening (56) is arranged in a manner aligned with a press-in shoulder (32, 33) of the at least one first contact element (26, 27) or of a second contact element (36) for pressing the first contact element (26, 27) or the second contact element (36) into a receiving opening (18) of the circuit carrier (14) or of the connection body (17).

8. The control device as claimed in claim 6, characterized in that the at least one slot (58) or the opening (56) is arranged in a manner aligned with a clearance between two first contact elements (26, 27) or between a first contact element and a second contact element (26, 27, 36) in the row of the at least one first contact element (26, 27).

9. The control device as claimed in claim 1, characterized in that the second contact elements (38a) which are arranged in a different row than the at least one first contact element (26, 27) are at least substantially designed like the at least one first contact element (26, 27).

10. The control device as claimed in claim 1, characterized in that the second contact elements (36, 38) have a different length on a side which is remote from the circuit carrier (14) such that the second contact elements (36) arranged in the same row as the at least one first contact element (26, 27) project beyond a second contact element (38) assigned to a different row.

11. The control device as claimed in claim 1, characterized in that a second contact element (76) forms a closed shielding area in the form of a side plate (73) in a plane running to the side of the at least one first contact element (26, 27).

12. The control device as claimed in claim 1, characterized in that the plug connection body (12) has, on the side which is remote from the circuit carrier (14), a separating element (80) which is arranged between two rows (3 to 5) of first and/or second contact elements (21, 26, 27, 36, 38; 38a; 72, 76) and an end surface of which projects beyond an end of the at least one first contact element (21, 26, 27), and in that the separating element (80) is made of metal, at least in certain regions, and the metal is connected to ground potential.

13. An electrical connection arrangement (1000) between a control device (10) as claimed in claim 1 and a plug (100) having at least one mating contact (28, 29) for making contact with a first contact element (26, 27) in the control device (10), characterized in that the at least one mating contact (28, 29) is surrounded by a shielding housing (45) at least in certain regions, and in that the shielding housing (45) is arranged in bearing contact with at least one second contact element (36; 72) of the control device (10).

14. The electrical connection arrangement as claimed in claim 13, characterized in that the plug (100) is in the form of a cable harness plug of a motor vehicle.

15. The control device as claimed in claim 1, wherein the first contact elements (21, 26, 27) are in the form of leadframe elements with first and second sections (23, 25, 31, 34) which are arranged in a straight line.

16. The control device as claimed in claim 1, wherein the first contact elements (21, 26, 27) are in the form of leadframe elements with first and second sections (23, 25, 31, 34) which are arranged in a straight line and at an angle with respect to one another.

17. The control device as claimed in claim 1, characterized in that the first and second contact elements (21, 26, 27, 36, 38; 38*a*; 72, 76) are arranged at standardized distances (a, b) from one another at least in a region of the plug connection body (12), also in the region in which they are connected to the circuit carrier (15) or to the connection body (17).

18. The control device as claimed in claim 1, characterized in that the second contact elements (36) which are arranged in the same row as the at least one first contact element (26, 27) on both sides of the at least one first contact element (26, 27) are identical to the at least one first contact element (26, 27), except in an end section (42).

19. The control device as claimed in claim 1, characterized in that two first contact elements (26, 27) arranged directly beside one another are part of an Ethernet line (2).

* * * * *